(12) United States Patent
Mack et al.

(10) Patent No.: US 7,726,663 B2
(45) Date of Patent: Jun. 1, 2010

(54) SELF-TIGHTENING DRILL CHUCK

(75) Inventors: Hans-Dieter Mack, Sontheim (DE);
Hans Bauman, Sontheim (DE); Peter Schenk, Niederstotzingen (DE)

(73) Assignee: Rohm GmbH, Sontheim (DE)

( * ) Notice: Subject to any disclaimer, the term of this patent is extended or adjusted under 35 U.S.C. 154(b) by 289 days.

(21) Appl. No.: 11/807,564

(22) Filed: May 29, 2007

(65) Prior Publication Data
US 2007/0273109 A1 Nov. 29, 2007

(30) Foreign Application Priority Data
May 29, 2006 (DE) .................. 10 2006 024 819

(51) Int. Cl.
*B23B 31/16* (2006.01)
(52) U.S. Cl. .................. 279/60; 279/125; 279/140; 279/902
(58) Field of Classification Search .................. 279/60, 279/61, 62, 125, 140, 902
See application file for complete search history.

(56) References Cited

U.S. PATENT DOCUMENTS

| | | | | |
|---|---|---|---|---|
| 4,302,021 A | * | 11/1981 | Rohm | 279/60 |
| 4,398,733 A | * | 8/1983 | Mosley, Jr. | 279/127 |
| 5,031,925 A | * | 7/1991 | Tatsu et al. | 279/64 |
| 5,232,230 A | * | 8/1993 | Lin | 279/62 |
| 5,499,830 A | * | 3/1996 | Schnizler | 279/62 |
| 6,517,088 B1 | * | 2/2003 | Rohm | 279/62 |
| 6,550,785 B2 | * | 4/2003 | Rohm | 279/62 |
| 7,156,402 B2 | * | 1/2007 | Mack | 279/60 |
| 7,185,895 B2 | * | 3/2007 | Cachod et al. | 279/62 |
| 7,503,565 B2 | * | 3/2009 | Rohm | 279/60 |
| 2006/0284386 A1 | * | 12/2006 | Mack | 279/60 |
| 2007/0235951 A1 | * | 10/2007 | Mack | 279/60 |
| 2008/0217869 A1 | * | 9/2008 | Mack | 279/62 |
| 2009/0058019 A1 | * | 3/2009 | Mack | 279/114 |

FOREIGN PATENT DOCUMENTS

DE 10 2005 018 392 A1 10/2006

OTHER PUBLICATIONS

Random House Dictionary, retrieved from http://dictionary.reference.com on Jan. 28, 2009.*

* cited by examiner

*Primary Examiner*—Eric A Gates
(74) *Attorney, Agent, or Firm*—Andrew Wilford

(57) ABSTRACT

A drill chuck has a chuck body, a holder body, and a front sleeve surrounding the bodies, with jaws between them. A ring of teeth on one of the bodies can be engaged by a pawl angularly fixed on the other of the bodies. When engaged, the pawl and the array of teeth allow rotate relative to the chuck body in a tightening direction but not in a loosening direction. Respective interengaging stops on the other body and on the front sleeve limit relative angular movement of the front sleeve on the other body between a pair of angularly offset end positions. A back control sleeve has a cam formation engageable with the pawl in only one of the end positions to hold the pawl in the freeing position. The pawl is biased by a spring in the other end position into the locking position.

6 Claims, 3 Drawing Sheets

SELF-TIGHTENING DRILL CHUCK

FIELD OF THE INVENTION

The present invention relates to a drill chuck. More particularly this invention concerns a self-tightening drill chuck.

BACKGROUND OF THE INVENTION

A self-tightening drill chuck such as described in German patent document DE 10 2005 018 392 published 26 Oct. 2006 has a chuck body centered on and normally also rotatable about an axis, a tightening sleeve that can be rotated coaxially on the chuck body and is axially supported on a jaw holder that is mounted on the chuck body and in which jaws are slidable in guide slots. The jaws can slide radially and axially for clamping and releasing by means of the jaw holder by a relative rotation between the chuck body and the tightening sleeve. The drill chuck also has a latch having a ring of teeth coaxial with the chuck axis, and a pawl mounted on the jaw holder and engageable with the ring gear under the force of a spring. The latch prevents the chuck body and the sleeve from undergoing relative rotation and releasing the jaws when the pawl is engaged with the ring gear, but does not hinder relative rotation for tightening the chuck.

A stop is provided on the jaw holder and a counterstop is provided on the tightening sleeve to define end positions for the relative rotation of the tightening sleeve with to the jaw holder. One end position corresponds to the engaged position of the pawl, and the other end position to the disengaged or freeing position thereof. A retainer device has seats associated with the two end positions and is mounted between the jaw holder and the tightening sleeve. This retainer only allows rotation of the tightening sleeve with respect to the jaw holder, at least in the rotational direction of the tightening sleeve corresponding to the clamping, once a predetermined clamping force has been attained.

Thus the chuck is tightened by rotating the sleeve in the tightening direction. This action shifts the sleeve, if necessary, into one end position and thereby causes it to rotationally entrain the jaw holder and jaws, moving these jaws radially inward and axially forward until they seat solidly on, for example, a tool. During this action the pawl ratchets on the sawteeth. The retainer holds the system in this position during the drilling operation and the angling of the teeth and pawl prevents the chuck from loosening. Normally also the structure is set that the forces in the chuck tend to tighten it during drilling, whence the self-tightening feature.

For loosening the chuck the sleeve is twisted in the loosening direction with enough force to free it from the spring force of the retainer and return it to the opposite end position, in which a cam formation on the sleeve tips the pawl into the freeing position. Further rotation of the sleeve in the loosening direction thus rotationally entrains the jaw holder and shifts the jaws axially backward and radially outward, and once this process is complete the retainer holds the chuck in this position until a new bit or the like needs to be chucked.

OBJECTS OF THE INVENTION

It is therefore an object of the present invention to provide an improved self-tightening and self-locking drill chuck.

Another object is the provision of such an improved self-tightening and self-locking drill chuck that overcomes the above-given disadvantages, in particular that is very easy to use, has a long service life, and is inexpensive to manufacture.

SUMMARY OF THE INVENTION

A drill chuck has according to the invention a chuck body centered on and rotatable about an axis, a holder body rotatable on the chuck body and formed with a plurality of angularly spaced guides, and a front sleeve surrounding the bodies. Respective jaws in the guides between the front sleeve and the chuck body can shift in the guides forward and together on rotation of the holder body in a tightening direction relative to the chuck body and oppositely on rotation of the holder body relative to the chuck body in an opposite loosening direction. An annular array of teeth rotationally fixed to one of the bodies can be engaged by a pawl angularly fixed on the other of the bodies. A spring biases the pawl into engagement with the teeth. The pawl and the array of teeth are oriented such that, when the pawl is in a locking position engaged with the array of teeth, the holder body can rotate relative to the chuck body in the tightening direction but not in the loosening direction and when in a freeing position disengaged from the teeth the holder body can rotate freely in either direction relative to the chuck body. Respective interengaging stops on the other body and on the front sleeve limit relative angular movement of the front sleeve on the other body between a pair of angularly offset end positions. A back control sleeve fixed rotationally in the front sleeve has a cam formation engageable with the pawl in only one of the end positions and holds the pawl when engaged therewith in the freeing position. The pawl is biased by the spring in the other end position into the locking position, and a spring-loaded retainer having a pair of angularly offset seats engageable with the front sleeve and releasably holding the front sleeve relative to the other body in the end positions.

In other words, this object is attained in a drill chuck of the above-described type where the tightening sleeve is connected in a rotationally fixed manner to a control sleeve carried on an inner circumferential surface of the tightening sleeve and having a radial cam for adjusting the pawl from the engaged position with the ring gear to the disengaged position when the tightening sleeve is rotated in the rotational direction corresponding to release of the jaws.

By additionally providing the tightening sleeve with a control sleeve, this control sleeve may be optimized with regard to the loads which occur, without having to change the mode of operation of the overall tightening sleeve or even of the drill chuck. In particular, the tightening sleeve may be produced from sheet metal, and, having a lightweight design that is sought in any case, the control sleeve may be provided as an inner lining at the high-load locations on the tightening sleeve. This design also ensures that the pivoting of the pawl is matched to the rotational motion of the tightening sleeve.

It is advantageous when the control sleeve supports the counterstop and the locking seat, since the higher load capacity of the control sleeve may also be utilized for the counterstop and the locking seat, although this is not absolutely necessary.

It is advantageous when the control sleeve has a sleeve rim or collar at its end in which a first recess is cut, the edge of which forms the counterstop. This recess may be easily produced by folding or flanging the sleeve collar of the control sleeve and then punching out the recess, so that, despite the use of an additional tool, the production costs for the drill chuck together with the control sleeve are not greatly increased. It is also advantageous when a second recess is cut from the sleeve collar for the locking seats, so that the advantages achieved by the first recess may also be realized for the locking seats. Higher load capacity and stability are achieved when the edge of the first recess and/or of the second recess are crimped, thereby providing a larger material thickness of the sleeve collar without having to design the sleeve collar with this same material thickness over its entire surface. Since the elastic properties of the sleeve collar are severely limited by the crimping of the first recess and in particular of the second recess, the second recess holds a retaining spring together with the two locking seats that are thus able to yield to the catch element associated with the jaw holder, which advantageously is implemented by a retaining pin provided on the jaw holder. It is then possible for the retaining spring to have an inset at the edges of which the locking seats are provided so that the catch pin comes to rest on one edge or the other when the two end positions are occupied.

It has also proven to be advantageous when the pawl is designed as a two-armed lever comprising at least one first lever arm having a ratchet, and a second lever arm designed to rest against the radial cam, thereby bridging the space between the radial cam and the ring gear in a simple manner, and by making use of the leverage force it is ensured that the ratchet presses adequately against the ring gear. In this embodiment the spring may impinge on the first lever arm having the ratchet, thus once again making use of the length of the lever arm and optimizing the action of force from the spring in the direction of the ring gear.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
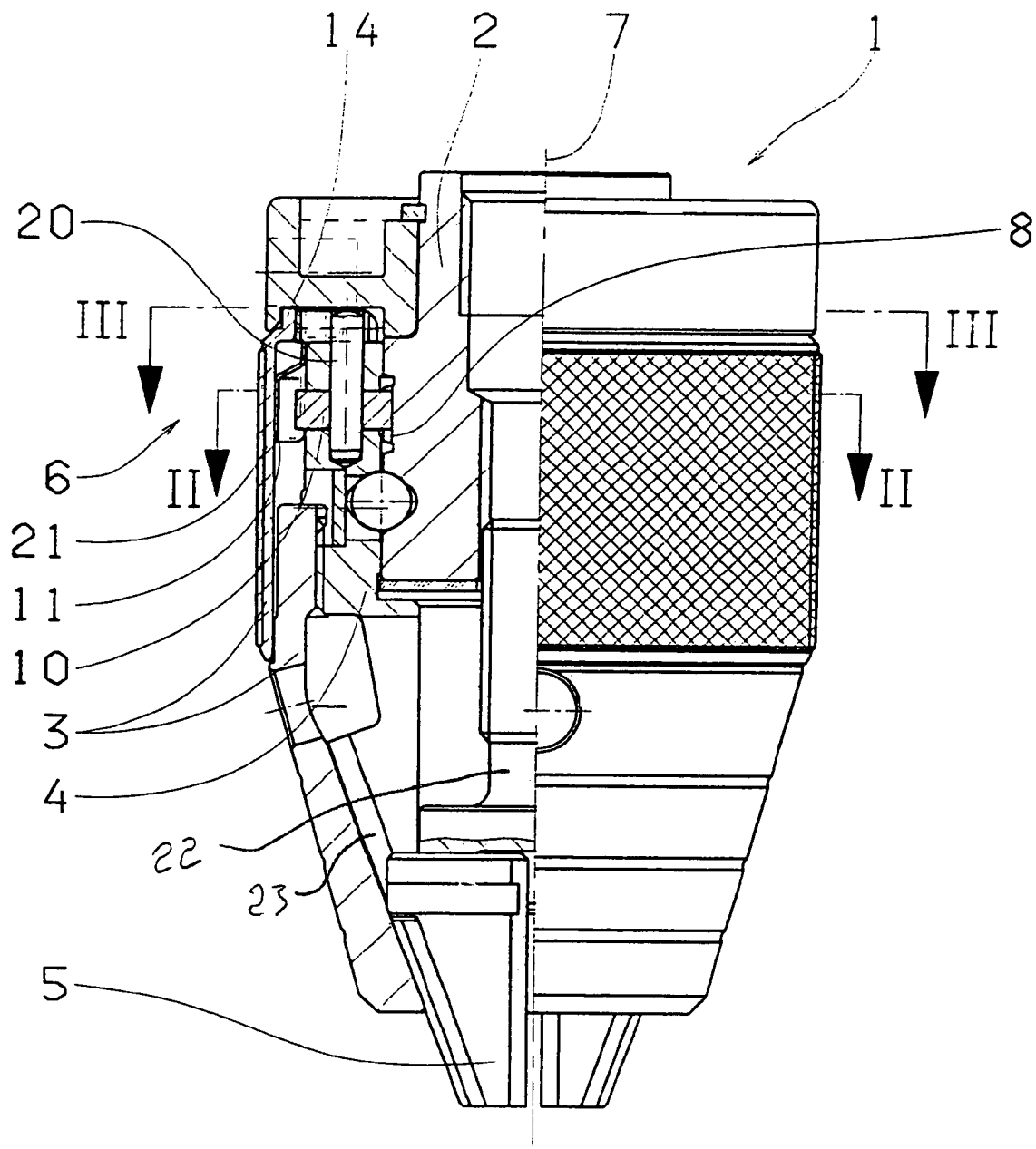
FIG. 1 is a side view half in axial section through a chuck according to the invention.

As seen in FIG. 1 a drill chuck 1 has a chuck body 2 centered on an axis 7, and a tightening sleeve 3 that is coaxially mounted on the chuck body 2 and is axially fixed on a jaw holder 4 that is also rotatably mounted but axially fixed on the chuck body 2. Jaws 5 are axially and radially shiftable in respective slots 23 in the jaw holder 4 and are radially slidable in axially forwardly open slots of a pusher 22 having a stem centrally threaded into the chuck body 2. Thus, as is standard, rotation of the sleeve 3, jaw holder 4, and pusher 22 relative to the chuck body 2 in a tightening direction will shift the jaws 5 axially forward and radially together, and opposite rotation in a loosening direction will shift them axially backward and radially apart.

Figure 2A:
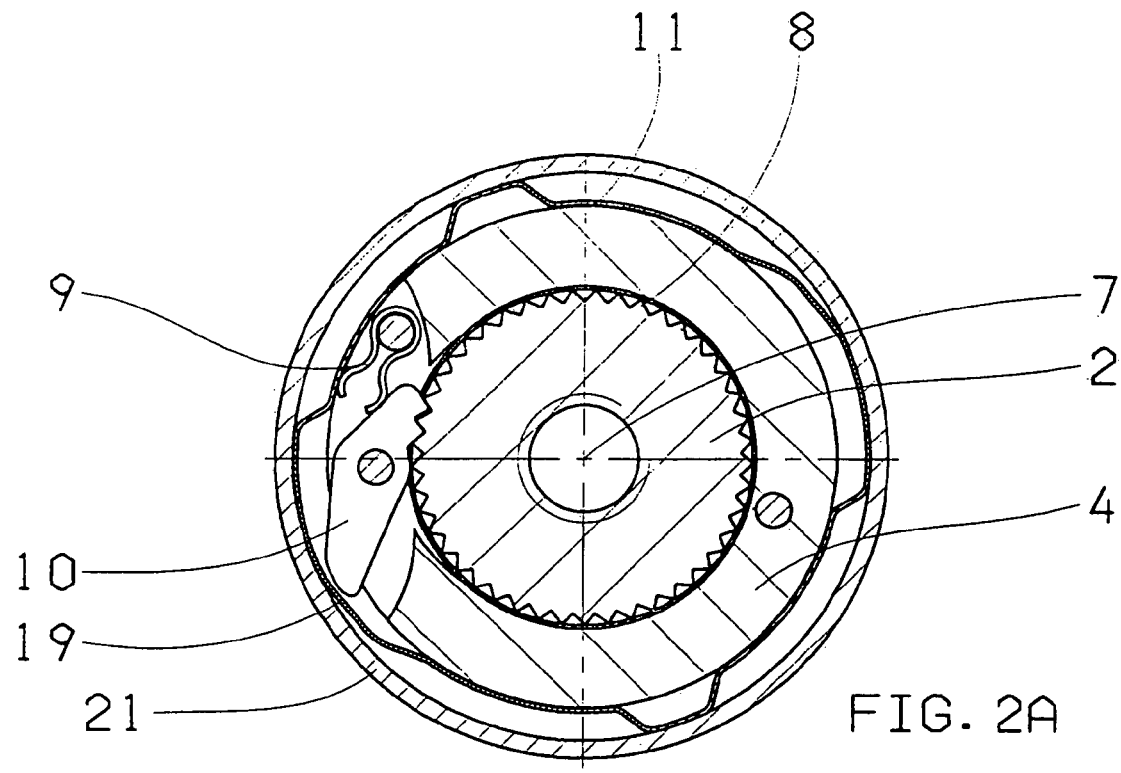
FIG. 2A is a section taken along line II-II of FIG. 1 in the locking position of the latch.
Figure 2B:
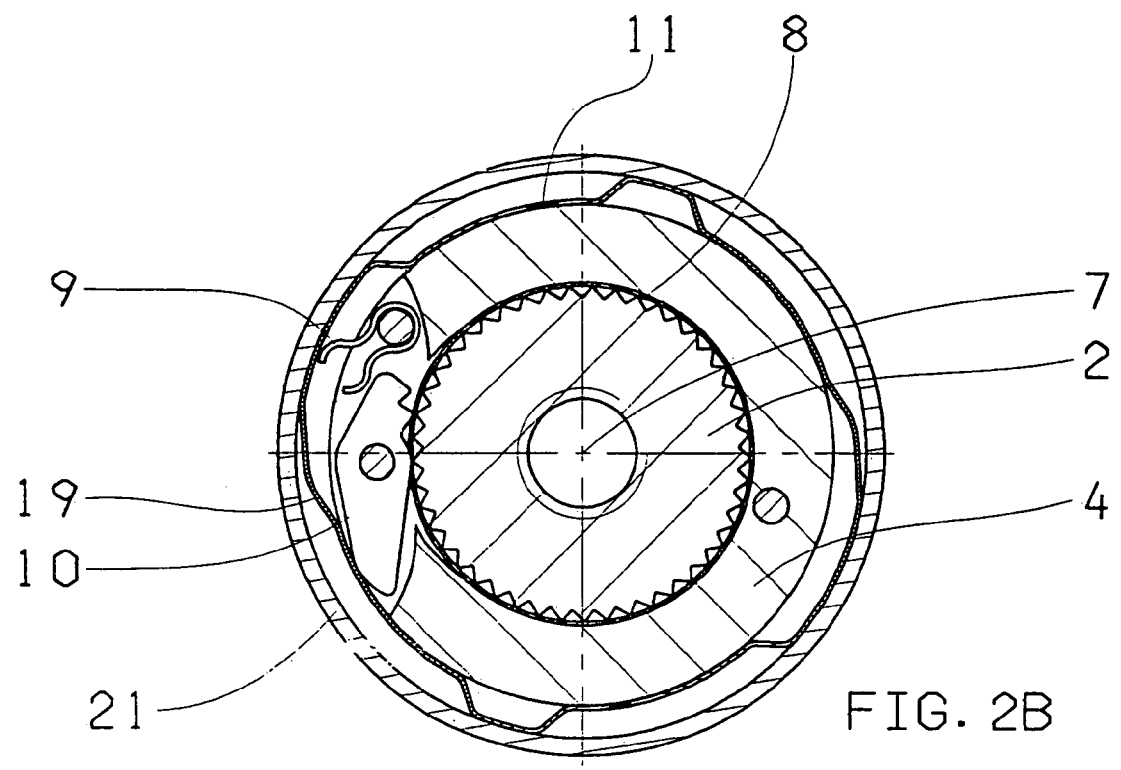
FIG. 2B is a view like FIG. 2A in the freeing position of the pawl.

The drill chuck 1 also comprises a latch 6 having a ring of teeth 8 here formed on the chuck body 2 and centered on the chuck axis 7, and a pawl 10 which is pivoted on the jaw holder 4 and engages with the ring gear 8 under the force of a spring 9. The latch 6 prevents the chuck body 2 and the pawl 10 from rotating relative to each other and releasing the jaws 5 when the pawl 10 is engaged with the ring gear 8, but does not hinder relative rotation in the tightening direction, when the latch 6 simply ratchets over the teeth 8. The pawl 10 is moved between its locking position (FIG. 2A), in which it inhibits loosening of the chuck, and its freeing position (FIG. 2B) by a pawl 10 described below.

FIG. 1 shows an embodiment in which the ring gear 8 is provided on the chuck body 2, and the tightening sleeve 3 has a two-piece design together with a back sleeve 21 which has the cam 19 and is used for adjusting the pawl 10, and which in the illustrated embodiment allows the tightening sleeve 3 to rotate with respect to the jaw holder 4 so that the axial front portion of the tightening sleeve 3 may be connected to the jaw holder 4 by even one thread.

Figure 3A:
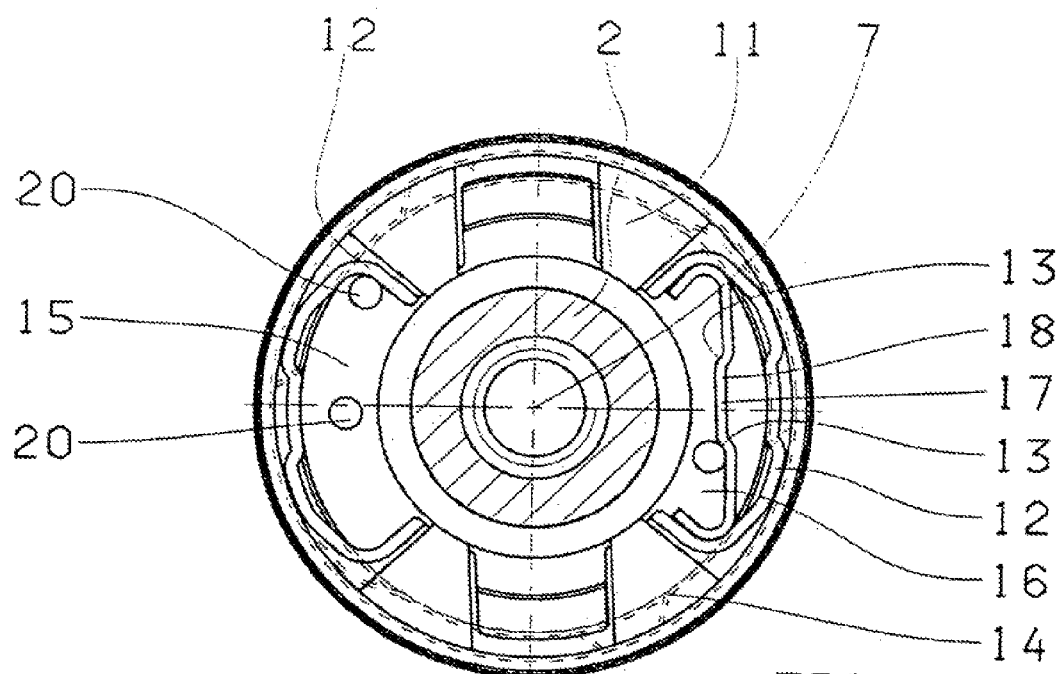
FIG. 3A is a section taken along line of FIG. 1 in the locking position.
Figure 3B:
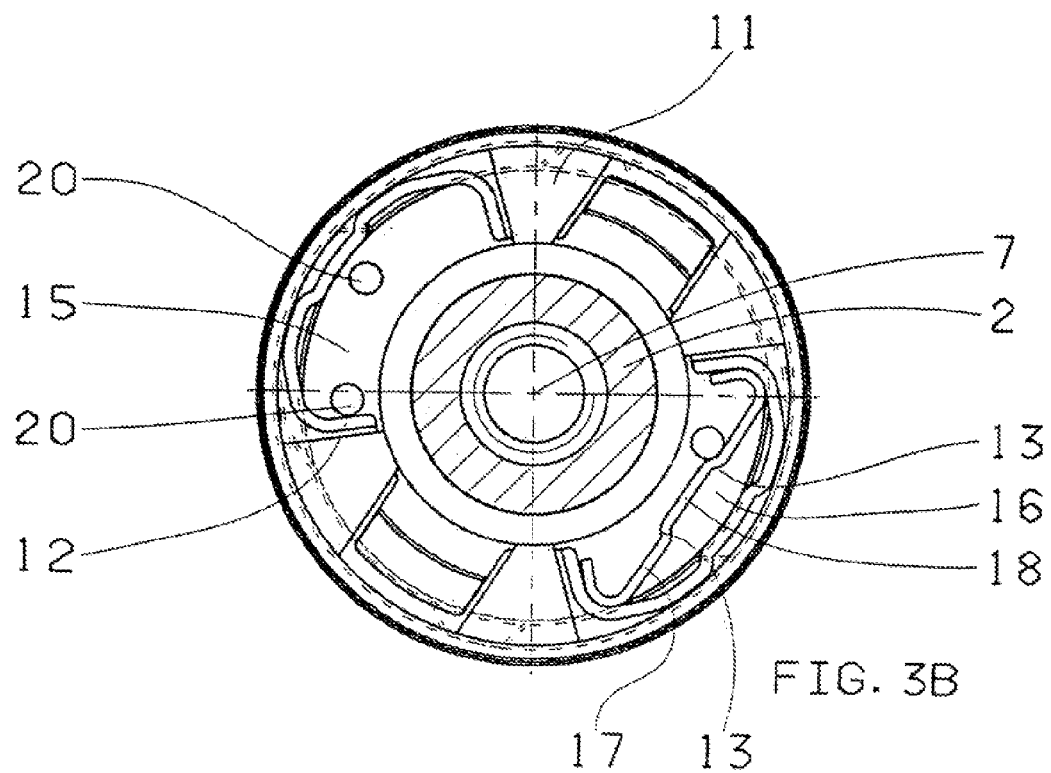
FIG. 3b is a view like FIG. 3A in the freeing position.

FIGS. 3A and 3B show that a stop 20 is associated with the jaw holder 4, and a counterstop 12 is associated with the back sleeve 21 of the tightening sleeve 3 for defined limitation of the relative rotation of the tightening sleeve 3 with respect to the jaw holder 4, between the first end position corresponding to the locking position of the pawl 10 and a second end position corresponding to the freeing position thereof. Since the back sleeve 21 is rotatable with respect to the jaw holder 4, the axial front end of the tightening sleeve 3, as previously described, may be rotationally fixed to the jaw holder 4.

The drill chuck 1 also comprises a retaining device, as shown in FIGS. 3A and 3B. This retaining device comprises locking seats 13 associated with the first end position and with the second end position and situated between the jaw holder 4 and the tightening sleeve 3. The retaining device only allows rotation of the back sleeve 21 with respect to the jaw holder 4, at least in the rotational direction of the tightening sleeve 3 corresponding to the clamping, once a predetermined clamping force has been attained. In practice, this occurs by the fact that the jaws 5 bear on a tool shaft when the drill chuck 1 is clamped, so that the further displacement of the jaws 5 is against greater resistance, which requires application of increased torque when the tightening sleeve 3 is rotated, and in this operating situation the retaining device is secured in the locking position of the pawl 10 with the ring gear 8.

To allow the drill chuck 1 to be opened for tool replacement, the pawl 10 must be disengaged from the ring gear 8, for which purpose the radial cam 19 associated with the tightening sleeve 3 for adjustment of the pawl 10 when the tightening sleeve 3 is rotated in the loosening direction corresponding to release of the jaws 5. The radial cam 19 is then operational when the first end position and the second end position are changed once again; i.e. the retaining device also changes the locking seat 13.

FIG. 1 shows that the tightening sleeve 3, i.e. the back sleeve 21 in the two-piece design shown, is connected in a rotationally fixed manner to a front sleeve control sleeve 11, carried on its inner surface, and which supports the radial cam 19 and also may include the counterstop 12 and the locking seats 13, which in FIG. 3, however, are associated with the back sleeve 21, which has a sleeve collar in which a first recess 15 is cut out and whose edge forms the counterstop 12. However, as described above, the control sleeve 11 may also be associated with the sleeve collar 14 in order to make beneficial use of the material properties thereof. The sleeve collar 14 also has a second recess 16 cut out for a second set of locking seats 13 formed by a catch spring 17 fitted in the second recess 16, the catch spring 17 having a locking cam 18 whose edges form the second set of locking seats 13. The edges of the first recess 15 and second recess 16 are crimped, resulting in an overall greater material thickness of the sleeve collar 14.

The control sleeve 11 also has the radial cam 19 for shifting the pawl 10 from the engaged position with the ring gear 8 to the disengaged position when the tightening sleeve 3 is rotated in the rotational direction corresponding to release of the jaws 5. Reference is made to FIG. 2, which shows that the radial cam 19 is set into the control sleeve 11, and therefore may also be produced in a particularly economical manner. The control sleeve 11 is made of metal.

The invention claimed is:

1. A drill chuck comprising: a chuck body centered on and rotatable about an axis; a holder body rotatable on the chuck body and formed with a plurality of angularly spaced guides; a front sleeve surrounding the bodies; respective jaws in the guides between the front sleeve and the chuck body; means for shifting the jaws in the guides forward and together on rotation of the holder body in a tightening direction relative to the chuck body and for opposite shifting of the jaws on rotation of the holder body relative to the chuck body in an opposite loosening direction; an annular array of teeth rotationally fixed to one of the bodies; a pawl angularly fixed on the other of the bodies and engageable with the teeth; a spring biasing the pawl into engagement with the teeth, the pawl and the array of teeth being oriented such that when the pawl is in a locking position engaged with the array of teeth the holder body can rotate relative to the chuck body in the tightening direction but not in the loosening direction and when in a freeing position disengaged from the teeth the holder body can rotate freely in either direction relative to the chuck body; respective interengaging stops fixed rotationally to the other body and to the front sleeve and limiting relative angular movement of the front sleeve on the other body between a pair of angularly offset end positions; a back sleeve fixed rotationally in the front sleeve; a cam formation engageable with the pawl in only one of the end positions, fixed rotationally to the sleeves, and holding the pawl when engaged therewith in the freeing position, the pawl being biased by the spring in the other end position into the locking position, the back sleeve having an end rim forming one of the stops; and a spring-loaded retainer carried on the back sleeve and held by the end rim thereof, having a pair of angularly offset seats engageable with the front sleeve, and releasably holding the front sleeve relative to the other body in the end positions.

2. The drill chuck defined in claim 1 wherein the back sleeve is formed with a second such recess angularly offset from the first-mentioned recess and having ends forming a second pair of stops.

3. The drill chuck defined in claim 2, further comprising a second spring-loaded retainer in the second recess.

4. The drill chuck defined in claim 1 wherein the rim is folded over at the stops.

5. The drill chuck defined in claim 1 wherein the retainer is a spring having an indent forming the seats.

6. The drill chuck defined in claim 1 wherein the back sleeve is made of metal.

* * * * *